United States Patent [19]
Ainsburg

[11] Patent Number: 5,280,555

[45] Date of Patent: Jan. 18, 1994

[54] VISUAL ACCIDENT PREVENTION SYSTEM

[76] Inventor: David P. Ainsburg, 199 Hampden St., 1st Floor, Chicopee, Mass. 01013

[21] Appl. No.: 12,514

[22] Filed: Feb. 2, 1993

[51] Int. Cl.[5] .............................................. G02B 6/06
[52] U.S. Cl. .................................... 385/116; 359/435; 340/436; 340/555
[58] Field of Search ............... 385/116, 117, 118, 119, 385/120, 121, 115; 359/843, 844, 435; 340/901, 902, 903, 904, 905, 555, 556, 436, 435

[56] References Cited

U.S. PATENT DOCUMENTS

| | | | |
|---|---|---|---|
| 1,589,475 | 6/1926 | Lowther | 296/97.3 |
| 2,096,142 | 10/1937 | Stover | 296/97.6 |
| 3,457,416 | 7/1969 | Elliott | 359/154 |
| 3,501,218 | 3/1970 | Zitzelberger | 385/119 |
| 4,968,124 | 11/1990 | Deckert et al. | 359/435 |
| 5,078,462 | 1/1992 | Gravisse | 359/350 |
| 5,087,985 | 2/1992 | Kitaura et al. | 359/350 |
| 5,165,497 | 11/1992 | Chi | 340/903 |

*Primary Examiner*—John D. Lee
*Assistant Examiner*—Phan Thi Heartney
*Attorney, Agent, or Firm*—Richard C. Litman

[57] ABSTRACT

The visual accident prevention system relates to accident prevention through the use of a lens system, a fiberoptic cable system and a display device system. A lens system is placed on each side of the vehicle, at the very least, on the front portion of the vehicle, and, preferably, on the front portion and on the rear portion of the vehicle. Each of these lens systems have a fiberoptic cable system leading from the lens system to the lens system's corresponding display device. Each of these display devices when considered, in toto, form the display device system. Each lens system consists of a converging lens which receives the image from the blind spot which corresponds to the lens system's position on the vehicle. This converging lens reduces the image size and outputs this reduced size image to the diverging lens on which the converging lens abuts. The diverging lens, in turn, corrects the convergence of the reduced size image output from the converging lens and delivers this corrected reduced size image to the fiberoptic cable. The fiberoptic cable then delivers the image to the corresponding display device.

12 Claims, 10 Drawing Sheets

VISUAL ACCIDENT PREVENTION SYSTEM

BACKGROUND OF THE INVENTION

1. Field of the Invention

The present invention relates to the field of accident prevention and more particularly to the use of visual lenses and fiber optic cables to provide a visual scan of the blind spots associated with a vehicle.

2. Description of the Prior Art

Various devices are used to enable the driver of a vehicle to see objects in the vehicle's blind spot, for transmitting images from the vehicle's blind spot to a viewing location and for changing a transmitted image in some way while the image is being transmitted.

U.S. Pat. No. 5,087,985 issued Feb. 11, 1992 to Koichi Kitaura et al. discloses a polarizer for visible light which is suitable for displays in automobiles.

U.S. Pat. No. 5,078,462 issued Jan. 7, 1992 to Philippe E. Gravisse discloses a screen for disturbing the transmission of electromagnetic radiation emitted by a source for reception by a receiver.

U.S. Pat. No. 4,968,124 issued Nov. 6, 1990 to Curt Deckert et al. discloses the use of vehicle viewing system for use on vehicles to enhance the vehicle's safe operation by minimizing blind spots.

U.S. Pat. No. 3,501,218 issued Mar. 17, 1970 to Don Zitzelberger discloses a viewing system for vehicles which includes pylon-type objective lens mountings on the exterior of the vehicle and a related viewing screen within the vehicle with intermediate light transmitting means. Means for manipulating the lens mountings are accessible from inside the vehicle to rotate and adjust the oblique positioning of the objective lens. Motion of the lens in adjusting the oblique positioning is accompanied by an automatic, appropriate readjustment of the viewing screen for stable image reflection.

U.S. Pat. No. 3,457,416 issued Jul. 22, 1969 to William G. Elliott discloses a system for transmitting two dimensional images from one point to another by dispersing a beam of electromagnetic radiation simultaneously along two coordinates as a function of wavelength, and intensity modulation of this dispersed radiation beam as a function of position. After modulation, the dispersed radiation is recollected into a beam and transmitted to the point of reception where it is again dispersed according to the same function of wavelength to recreate a two dimensional dispersion which has been intensity modulated according to position.

U.S. Pat. No. 2,096,142 issued Oct. 19, 1937 to Jerry S. Stover discloses an auxiliary glare shield in the nature of an attachment detachably connectible with a so called conventional non-transparent glare shield of the type used as a sun visor.

U.S. Pat. No. 1,589,475 issued Jun. 22, 1926 to Christopher M. Lowther discloses a nonglare screen for automobiles.

None of the above inventions and patents, taken either singly or in combination, is seen to describe the instant invention as claimed.

SUMMARY OF THE INVENTION

Accordingly, it is a principal object of the invention to provide a visual accident prevention system, hereinafter referred to as a VAPS, for a vehicle which provides the driver of the vehicle with a view of objects in the blind spots to the front and rear of the vehicle. Of particular note is the fact that, for the purposes of this application, the term "blind spot" is seen to differ from the common usage. Insofar as the present invention is concerned, the term "blind spots" refers to the areas hidden from a vehicle operator's view by objects, structures or other vehicles to the sides of the exemplary mounting vehicle, and not to difficulties in viewing areas obstructed by the body of the exemplary vehicle itself, as there are devices in existence that address that specific objective.

It is another objective of the invention to provide a VAPS for a vehicle which provides the driver of the vehicle with a clear view of objects in the blind spots of the vehicle where the objects which are clearly viewed are in a range of distances from fifteen feet to infinity away from the side, front or rear of the vehicle.

It is a further object of the invention to provide a VAPS for a vehicle which consists of a lens system, a fiberoptic cable system and a display device system.

Still another object of the invention is to provide a VAPS for a vehicle where the lens system which includes a converging lens, which receives an image from the blind spot, and transmits a reduced size image to a diverging lens against which the converging lens abuts which, in turn, supplies a clear reduced size image to a fiberoptic cable, which transmits this image to a display device which is part of the display device system.

It is an object of the invention to provide improved elements and arrangements thereof in an apparatus for the purposes described which is inexpensive, dependable and fully effective in accomplishing it intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
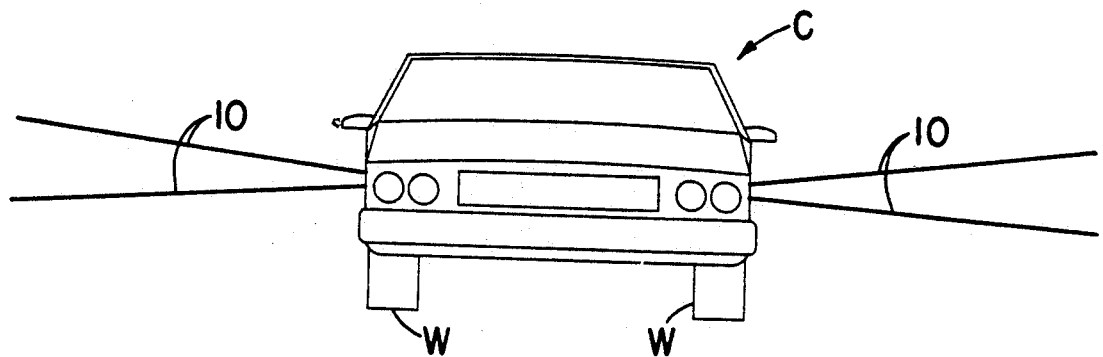
FIG. 1 is a front, mainly diagrammatic view showing the fields of view of the VAPS.
Figure 2:
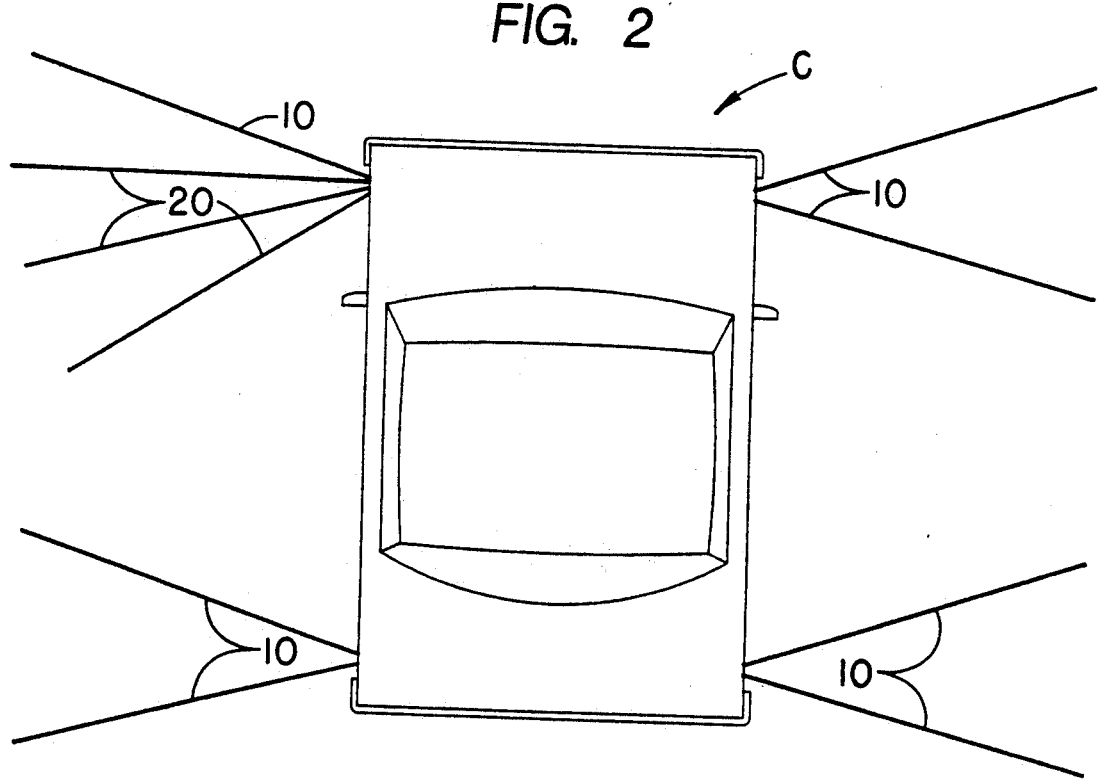
FIG. 2 is a top plan, mainly diagrammatic view of preferred embodiments of both a full (front and rear) and partial (front or rear) VAPS.

The present invention is a visual accident prevention system, also known as a VAPS. FIGS. 1 and 2 represent the two fields of vision that the VAPS may have. FIG. 1 represents a front view of the fields of view 10 of a partial VAPS installed on the front portion of a vehicle C. FIG. 2 represents a top view of a representation of the fields of view 10 of a partial VAPS installed on the front and rear portions of the passenger's side (the right side in this figure) of vehicle C. The driver's side of the vehicle C of FIG. 2 shows a representation of the fields of view 10 and 20 of the full VAPS installed on the front and rear sections where 10 is the partial field of view of the VAPS and 20 is the extended field of view of the VAPS.

Figure 3A:
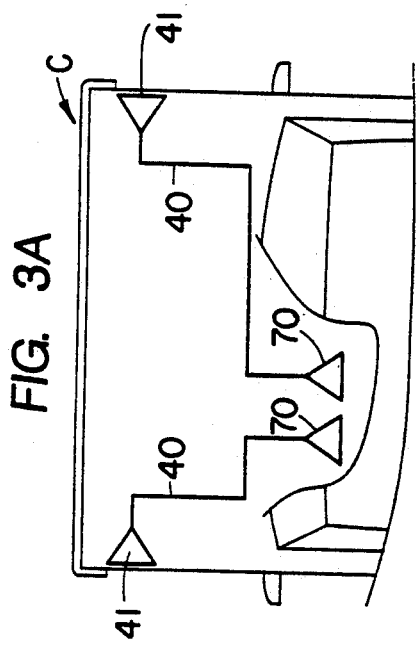
FIG. 3A is a top plan sectional view, partially diagrammatic, of a mirror assembly used in conjunction with the front and rear system of the VAPS.
Figure 3B:
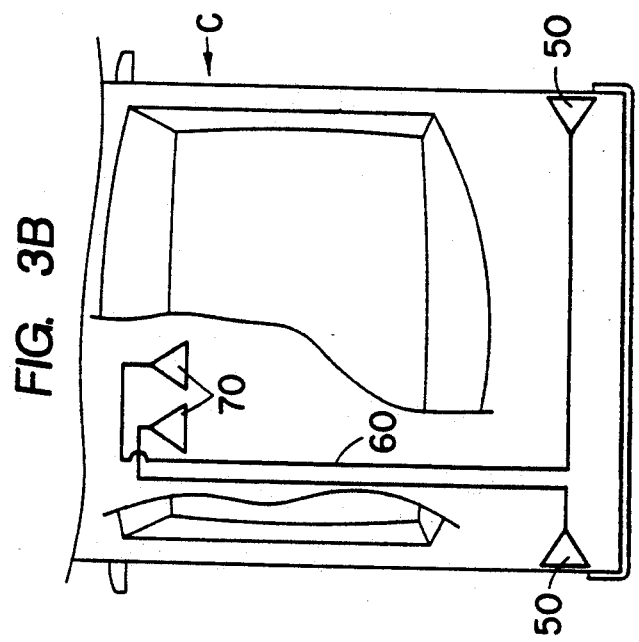
FIG. 3B is a top plan sectional view, partially diagrammatic, of a mirror assembly for the front portion of a vehicle used in conjunction with the front system of the VAPS.
Figure 3:
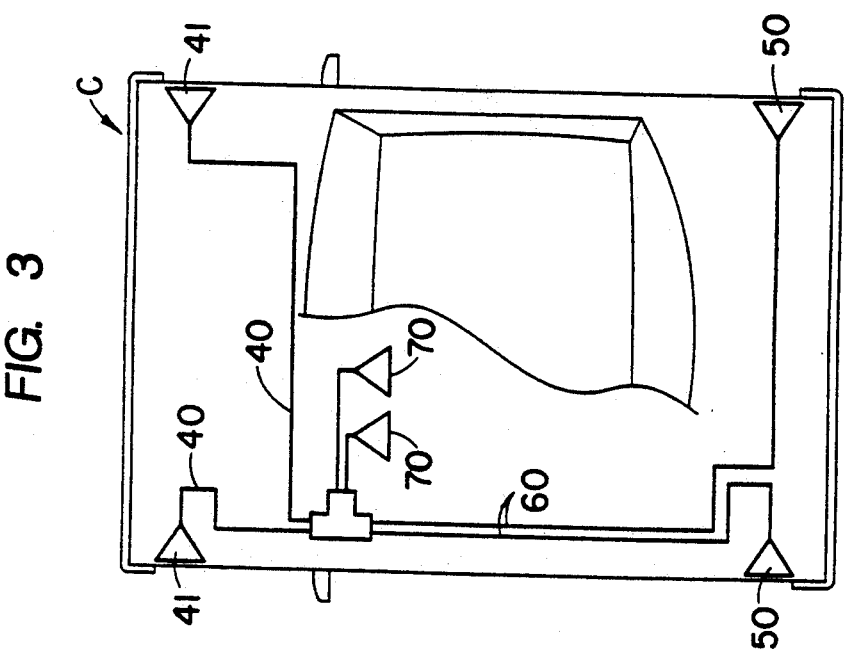
FIG. 3C is a top plan sectional view, partially diagrammatic, of a mirror assembly for the rear portion of a vehicle used in conjunction with the rear system of the VAPS.
Figure 4:
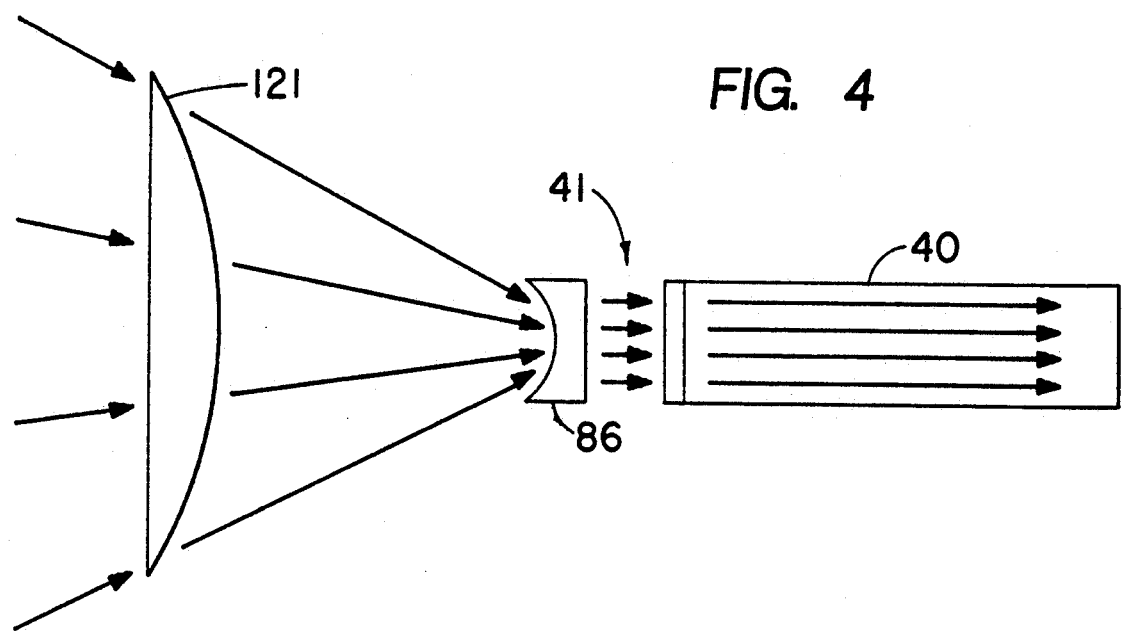
FIG. 4 is a side elevational, partially diagrammatic view of the front end of the visual pickup and a portion of the connecting fiber optic bundle of the VAPS.
Figure 6:
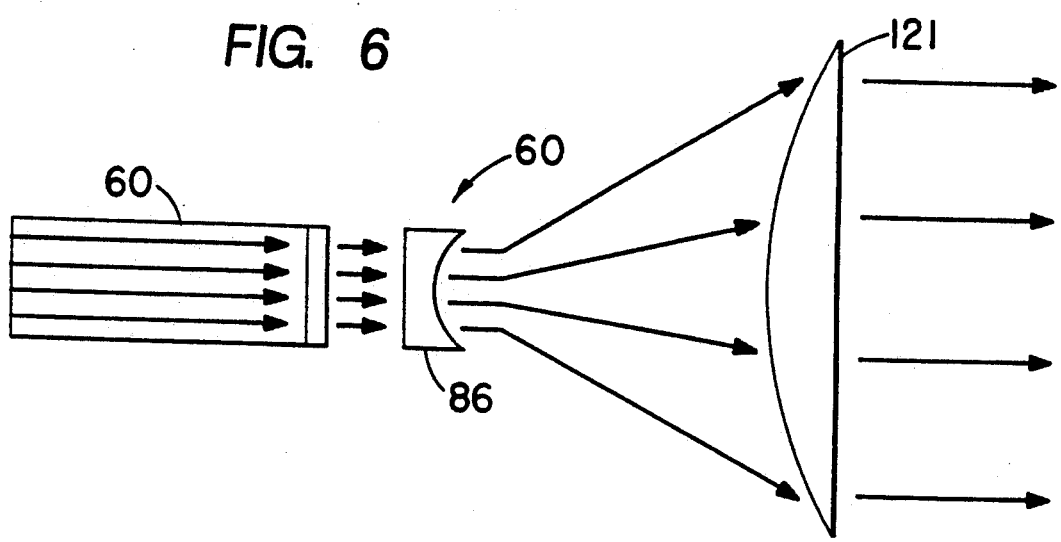
FIG. 6 is a side elevational, partially diagrammatic view of the rear end of the visual pickup and a portion of the fiber optic bundle of the VAPS.

One standard embodiment of the VAPS (see FIG. 3) provides for the attachment of at least one fiberoptic transmitter cable 60 (see FIG. 6) and at least one fiberoptic receptor cable 40 (see FIG. 4) and uses a mirrored surface switching assembly to reflect desired light beam transmission(s) to the desired fiberoptic receptor cable(s) while simultaneously blocking the transmission or reception from the other fiberoptic cable(s). In other embodiments (see FIGS. 3A and 3B), a VAPS may omit the mirrored surface switching assembly while retaining at least one fiberoptic receptor-transmitter cable pair for each receptor and display combination.

Figure 15:
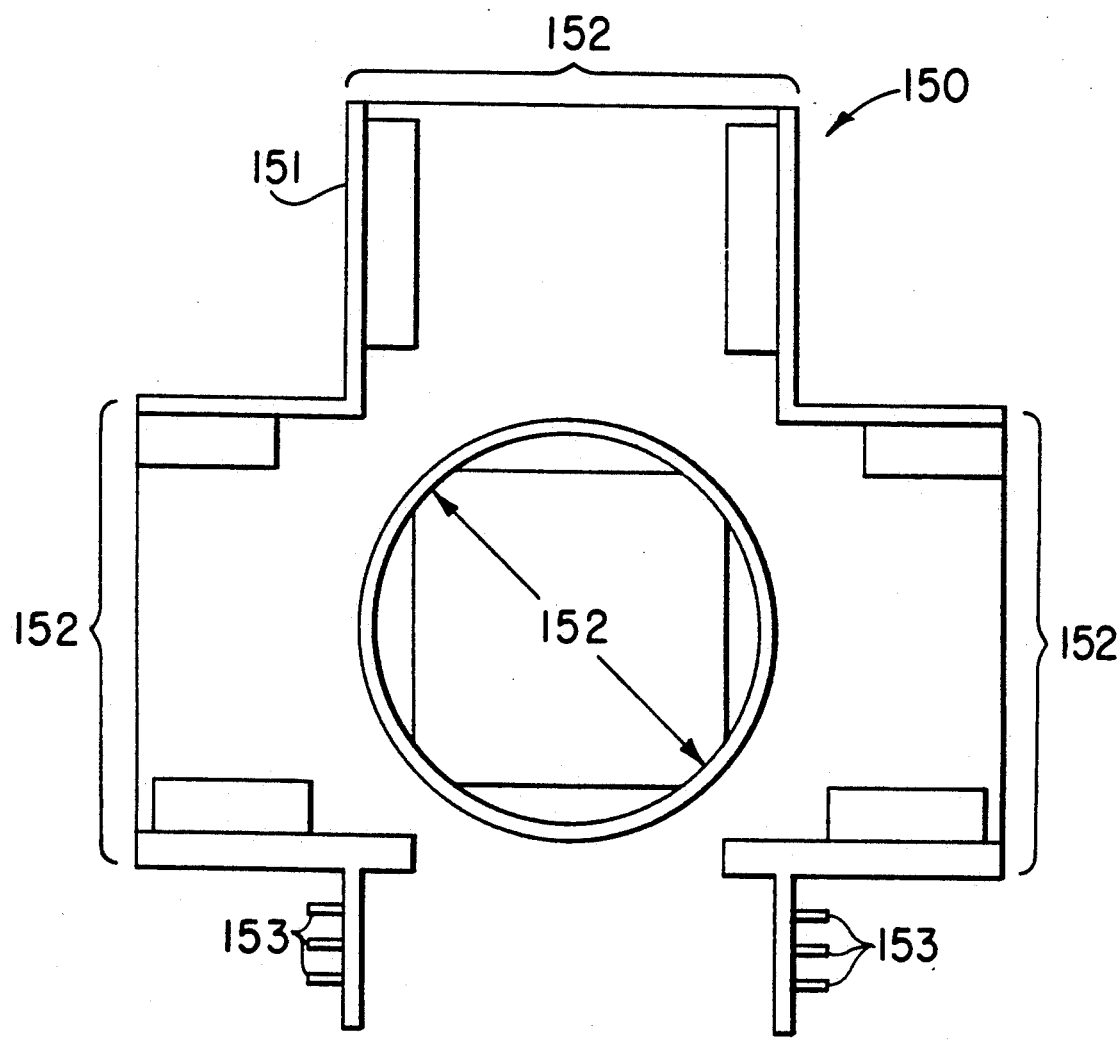
FIG. 15A is an interior view of a multiple-way assembly for fiberoptic receptor cables for the VAPS.
FIG. 15B is an interior view of a rotary switch assembly for the multiple-way assembly for fiberoptic receptor cables for the VAPS.
FIG. 15C is an interior view of a hinged switch assembly for the multiple-way assembly for fiberoptic receptor cables for the VAPS.
Figure 15A:
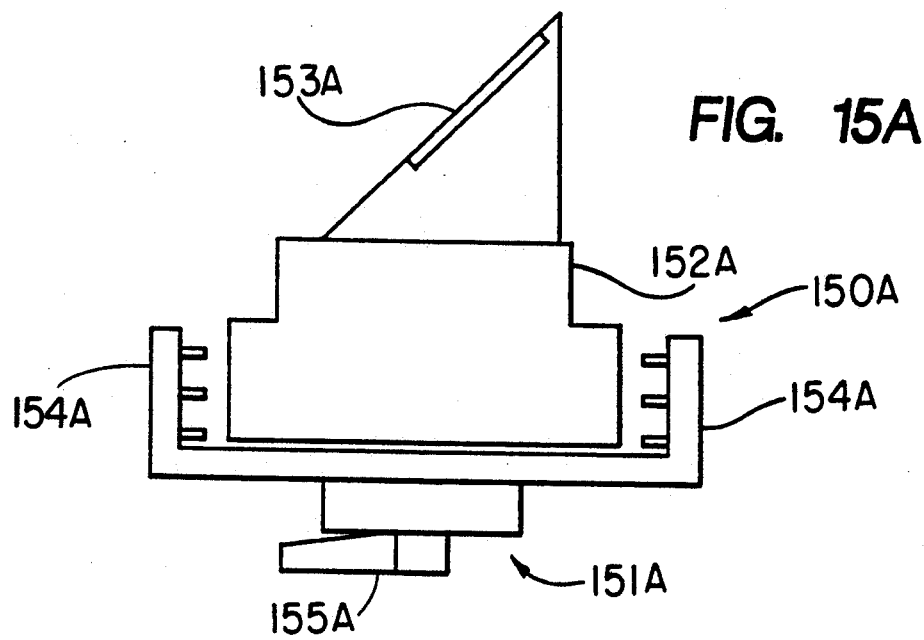
Figure 15B:
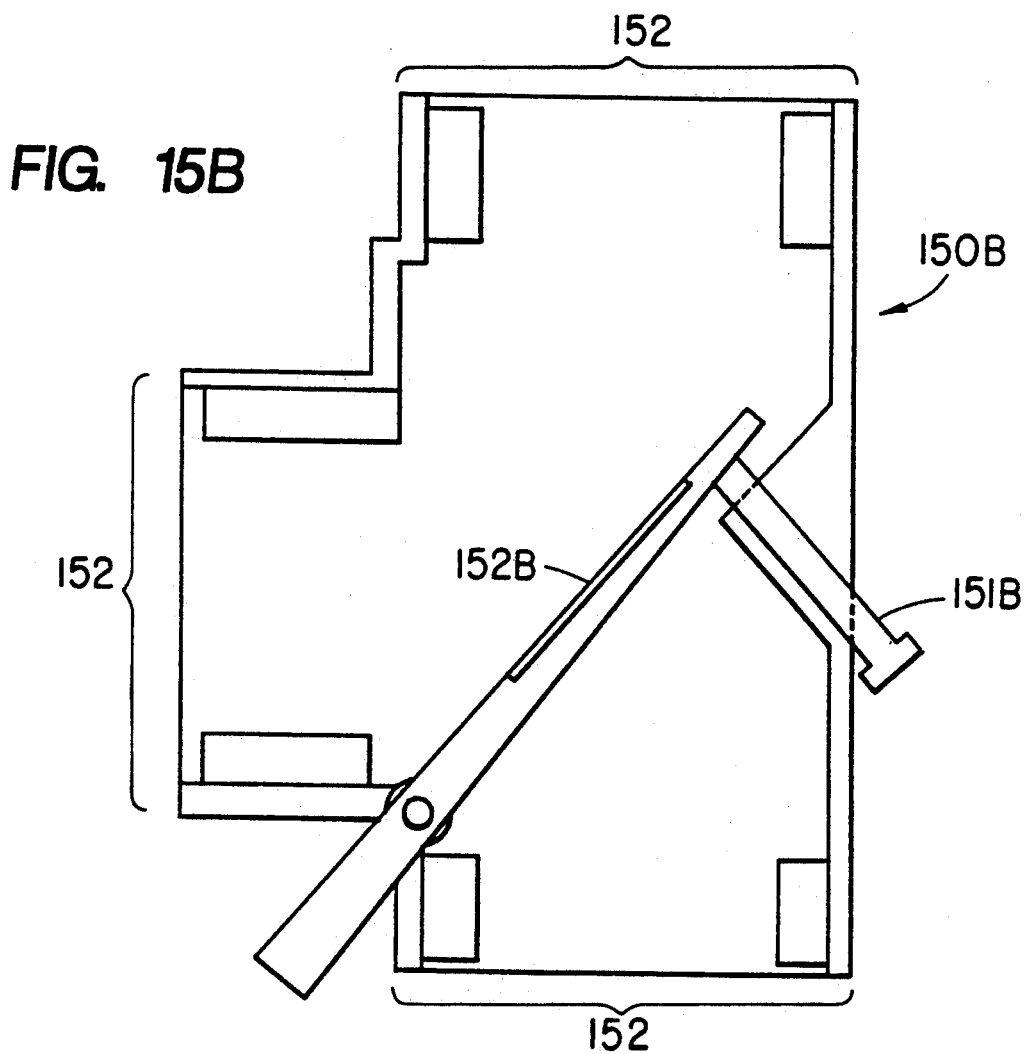

Referring to FIG. 15, a connector casing 150 consists of an outer casing 151 fitted to receive the desired number of fiberoptic transmission cables via port 152 configured for conventional straight tip type connector (not shown). The connector casing 150 also incorporates a switch assembly mount 150A, 150B (see FIGS. 15A and 15B). The switch assembly mount 150A of FIG. 15A has a rotary method of operation and the switch assembly mount 150B of FIG. 15B has a hinged method of operation. The rotary switch assembly 151A has a mobile fixture 152A which mounts a reflective surface 153A which may be either flat or curved at an appropriate angle for reflection of the transmitted signal to the receptor cable(s) 40 (see FIG. 4). The rotary switch assembly 151A is made up of a main body piece which is connected to the outer casing 151 via a threaded retaining coupler 154A with mating threads 153 on the outer casing 151 and a connector for the switch activation apparatus 155A.

The hinged switch assembly 150B incorporates an angle adjustment device 151B which is a threaded screw passing through the body of the outer casing 151 to adjust precisely the angle of reflection of a reflective surface 152B which may be flat or curved. The hinged switch assembly 150B further includes a main body piece having provision for connection to the outer casing 151 via a hinge arrangement. The outer casing 151 in this case is shaped to allow the hinged switch assembly 150B to completely clear the light path when in a straight or nonreflecting mode.

Figure 5:
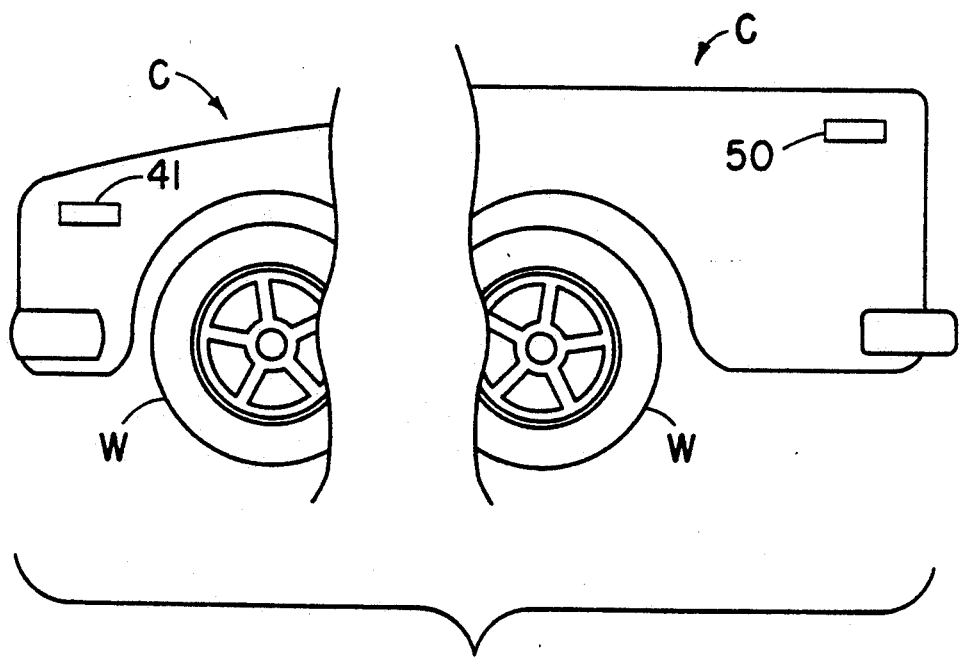
FIG. 5 is a partial, side elevational view of the driver's side of a vehicle showing the pickups of the VAPS.
Figure 7:
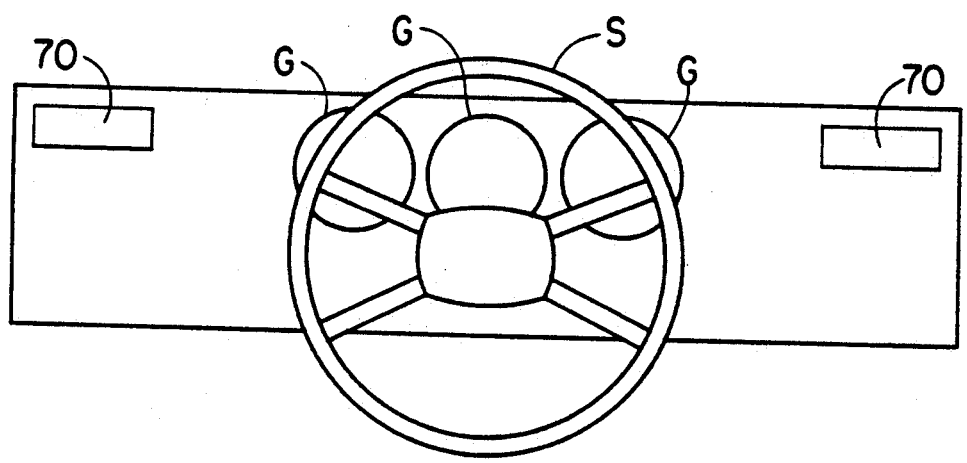
FIG. 7 is a front view of the placement for the viewing lenses of the VAPS on the driver's side of the dash of the vehicle.

Returning to FIG. 15A, the switch activation apparatus 155A includes a cable assembly 155A linked to a conventional gear selector of vehicle C (not shown) in such a manner as to automatically select the input from the forward receptors 41 (see FIGS. 3, 3A and 5) to be transmitted to the display devices 70 (see FIG. 7) when vehicle C is in a forward gear and the input from the rear receptors 50 (see FIGS. 3, 3B and 5) when vehicle C is in a reverse gear. Alternatively, a sensor (not shown) set to detect the direction of rotation of either a wheel W (see FIG. 1), an axle or a drive train component could be used in conjunction with an electric solenoid to perform the same function.

Figure 9:
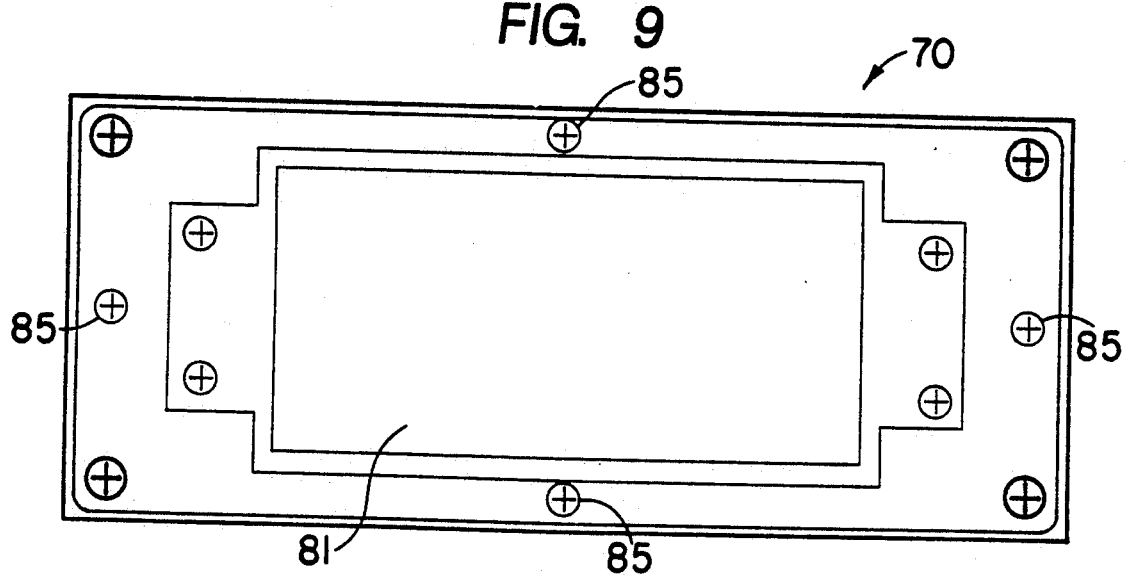
FIG. 9 is a front, outside view of the cover plate, retaining screws, and adjusting screws of either the receptor or the display units of the VAPS. In this embodiment, the outside appearance of the receptor and display units are similar in these respects (excepting the overall size of the unit)
Figure 8:
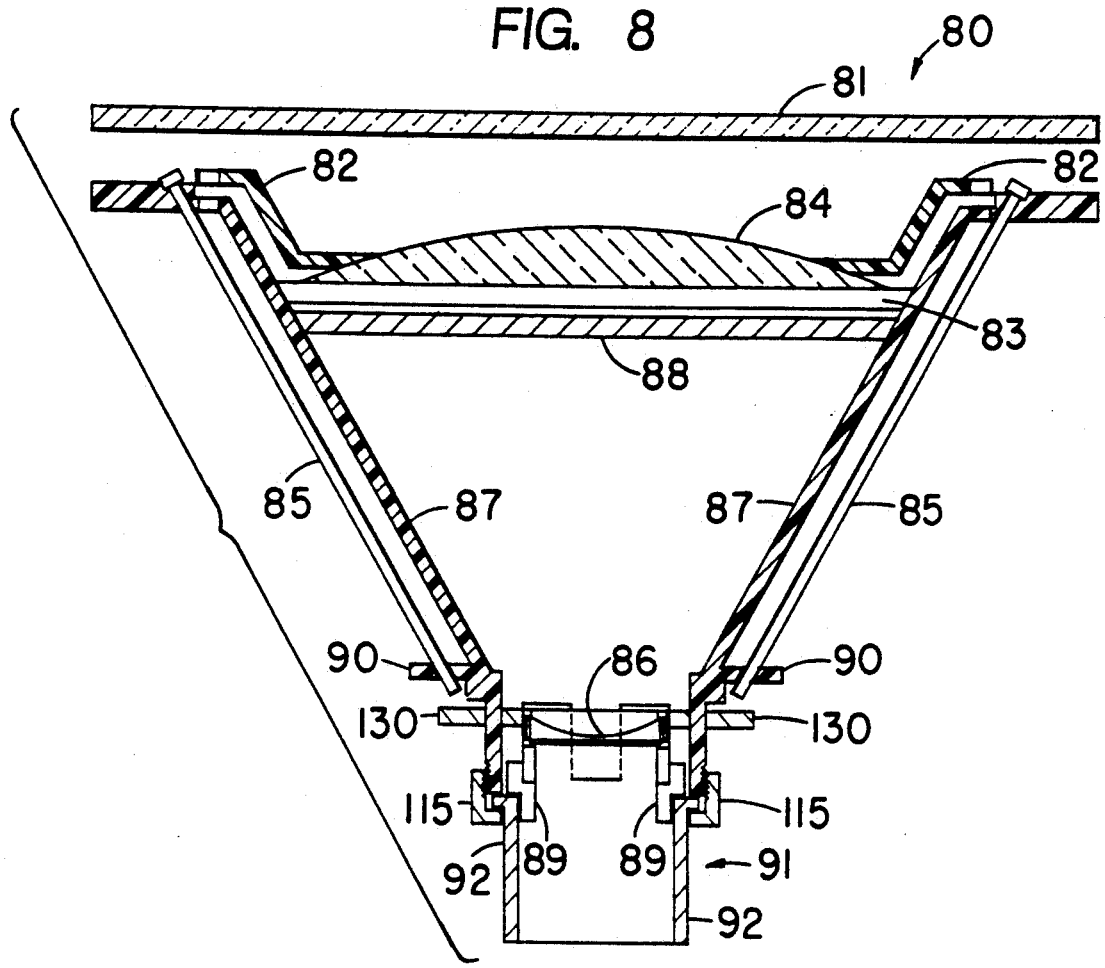
FIG. 8 is a top, sectional view of an embodiment of a visual receptor unit used in the VAPS.
Figure 11:
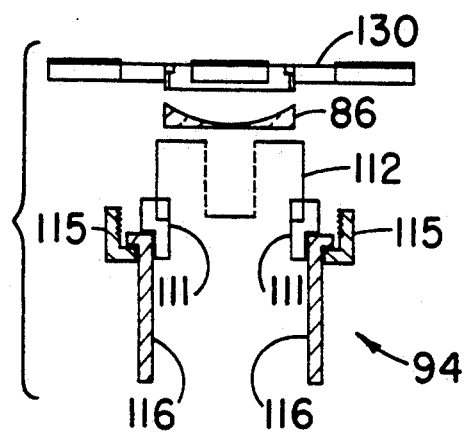
FIG. 11 is an exploded view, partly in section, of an embodiment of the diverging lens assembly and casing of the receptor unit of the VAPS.
Figure 10:
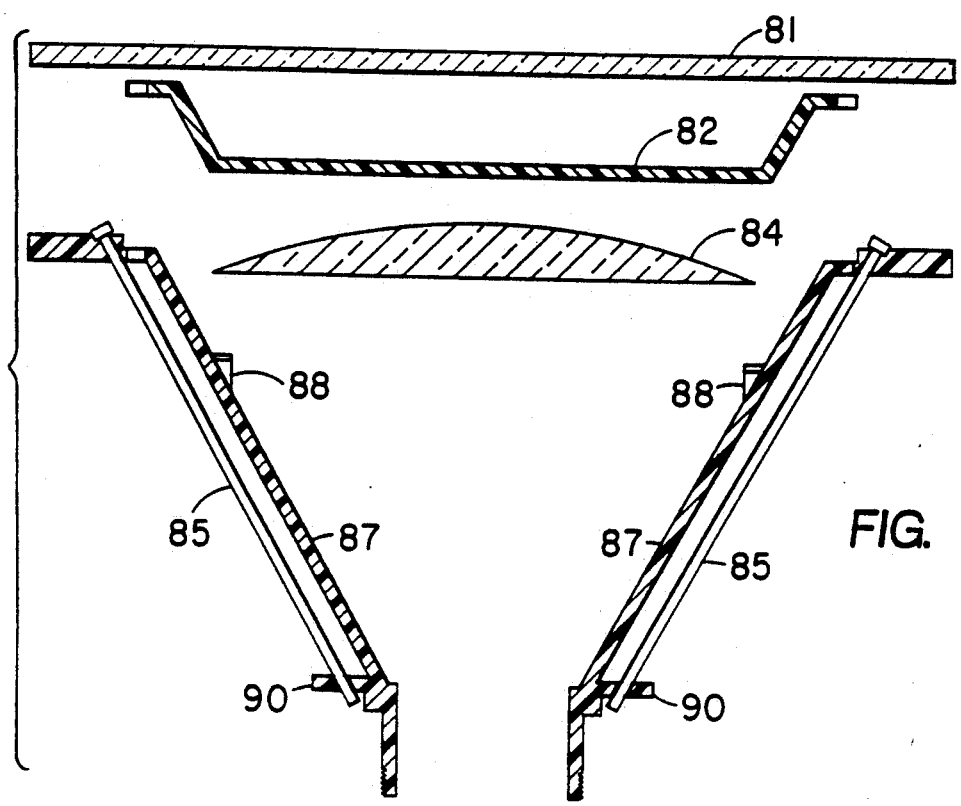
FIG. 10 is an exploded view, partly in section, of an embodiment of a main body and converging lens assembly of the receptor unit of the VAPS.

The VAPS requires a pair of visual receptor devices 41, 50 to be mounted on opposite sides of vehicle C and as far to the front and/or rear as structurally appropriate. As the individual receptors 80 (see FIG. 8) are functionally and structurally similar, only one such device is depicted. Each device is constructed in the following manner. A cover plate 81 for the individual receptor 80 is made of a transparent material such a plastic or glass and either coated with or constructed of such material as will reduce or eliminate the transmission of harmful frequencies or uncomfortable intensities of light. For example, polarizing, ultraviolet or infrared absorbing or reflecting materials or combinations thereof may be employed so as to protect both the components and the user of the device, i.e., the driver of the vehicle C. A converging lens retainer 82 constructed of a suitable material such as a high strength plastic, incorporates a padding material 83 such as foam or a soft rubber compound on a surface contacting the lens which is installed behind the cover plate 81. A convex, plano-convex or asymmetrical converging lens 84 is oriented with its appropriate curvature to the image source to focus the light image received through the cover plate 81 thus reducing the size of the light image. A concave, plano-concave or asymmetrical diverging lens 86 is oriented with its appropriate curvature toward the image source such that the diverging lens 86 receives the reduced size light image from the converging lens 8. The diverging lens 86 corrects the convergence of the light rays imparted by the converging lens 84 to produce an essentially coherent, reduced image. This is intended to improve image transmission quality by reducing or eliminating the diffraction, reflection or refraction caused when light rays enter an interface between materials of different densities at an angle, e.g., air and the receptor end of a fiberoptic cable. The conjunction of the converging lens 84 and the diverging lens 86 is designed to provide reasonably clear images of objects at distances of fifteen feet to infinity and have a field of view no less than approximately ten feet wide at the minimum focusing distance. A lens casing 87 made of a suitable material, e.g., high strength oil and heat resistant plastic or polymer, is designed to surround and protect the components described above and shown in FIGS. 8, 10 and 11. The interior of the lens casing 87 incorporates a padded flange 88 and support the converging lens 84 and another flange 89 to seat the diverging lens assembly 86. The exterior of the lens casing 87 has guide tabs 90 to align and support the diverging lens adjusting screws 85 and rear section 91 which is slotted to accept the diverging lens adjusting bracket 130 and threaded for the diverging lens assembly retaining coupler 115. The symmetrical design of the lens casing 87 is intended to allow ease of manufacturing via a two piece, mirror image process, thus reducing cost. A diverging lens assembly casing 110 constructed of a two piece design and of a suitable material, e.g., a high strength oil and heat resistant plastic or polymer, has a first lens piece 112 incorporating a padded interior flange 111 padded with either a memory type foam rubber or compound or a coil spring and spacer assembly to provide both stability and consistency of adjustment to the diverging lens 86. The first lens piece 112 also incorporates slots for the diverging lens adjusting bracket legs 116 at its front. The second connecting piece 92 should also include an interior flange (not shown) to support an optional speed linked electromechanical shutter (not shown) designed to open only at low or zero speeds to reduce or eliminate any discomfort to a driver who is susceptible to vertigo or motion sickness. The connecting piece 92 also is constructed with an exterior retaining flange for the diverging lens assembly retaining coupler 115 and is designed to accept a conventional, straight tip type fiberoptic connector at it's rear. A coherent fiberoptic cable of an appropriate size and shape to receive and transmit the reduced image to a display system (shown in FIGS. 7 and 9) is connected to the diverging lens assembly 94 (see FIGS. 11 and 12) via a straight tip type connector (not shown). An alternative to the standard multistrand fiberoptic cable may consist of a single strand or rod of light transmitting material capable of transmitting the desired image (Lucite or glass are common materials) using mirrored reflectors, prisms, or lengths of multistrand fiberoptic cable to pass the image through bends or corners. The fiberoptic cable need not be of the exact size and shape of the image to be transmitted so long as the size of the desired image does not exceed the borders of the receptor end of the fiberoptic cable. For example, a round fiberoptic cable could be used to transmit an image of another shape or vice versa, subject to the size of the desired image.

The light image transmission system of the standard VAPS is composed of a coherent fiberoptic cable using conventional straight tip type connectors to maintain cable alignment without unnecessary manufacturing expense. The fiberoptic cable's resolution or clarity of transmission need not be of photographic quality as long as the operator has no difficulty in discerning images within an approximate distance of sixty feet from the receptor device. For the purpose of manufacturing flexibility, the adjustable orientation connection method detailed as follows has been devised. The diverging lens assembly (see FIG. 11) of the receptor device used in the VAPS is configured to accept a straight tip type fiberoptic cable connector in either of two positions, the aligned or normal position and the one hundred eighty degree or reversed position. In the aligned position, the top of the fiberoptic cable at the receptor device 41, 50 is aligned with the top of the fiberoptic cable at the display device 70. In the one hundred eighty degrees position, the top of the fiberoptic cable at the receptor device 41, 50 is reversed to become aligned with the bottom of the fiberoptic cable at the display device 70. This capability is intended to allow the maximum flexibility in lens configuration by compensating for the inversion of the image caused by placing the second lens system beyond the focal point of the first lens for purposes of manufacturing economy or convenience in lens selection.

Figure 14:
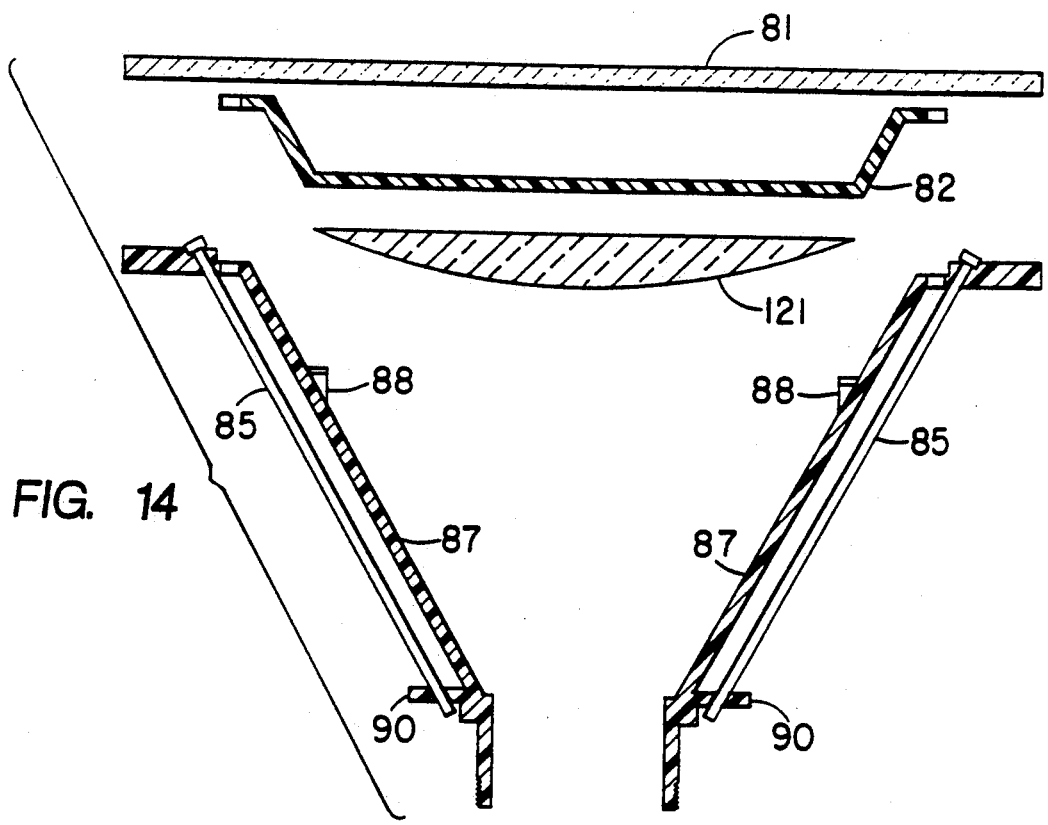
FIG. 14 is a top, sectional view of an embodiment of the main body and converging lens assembly of a driver's display unit.
Figure 12:
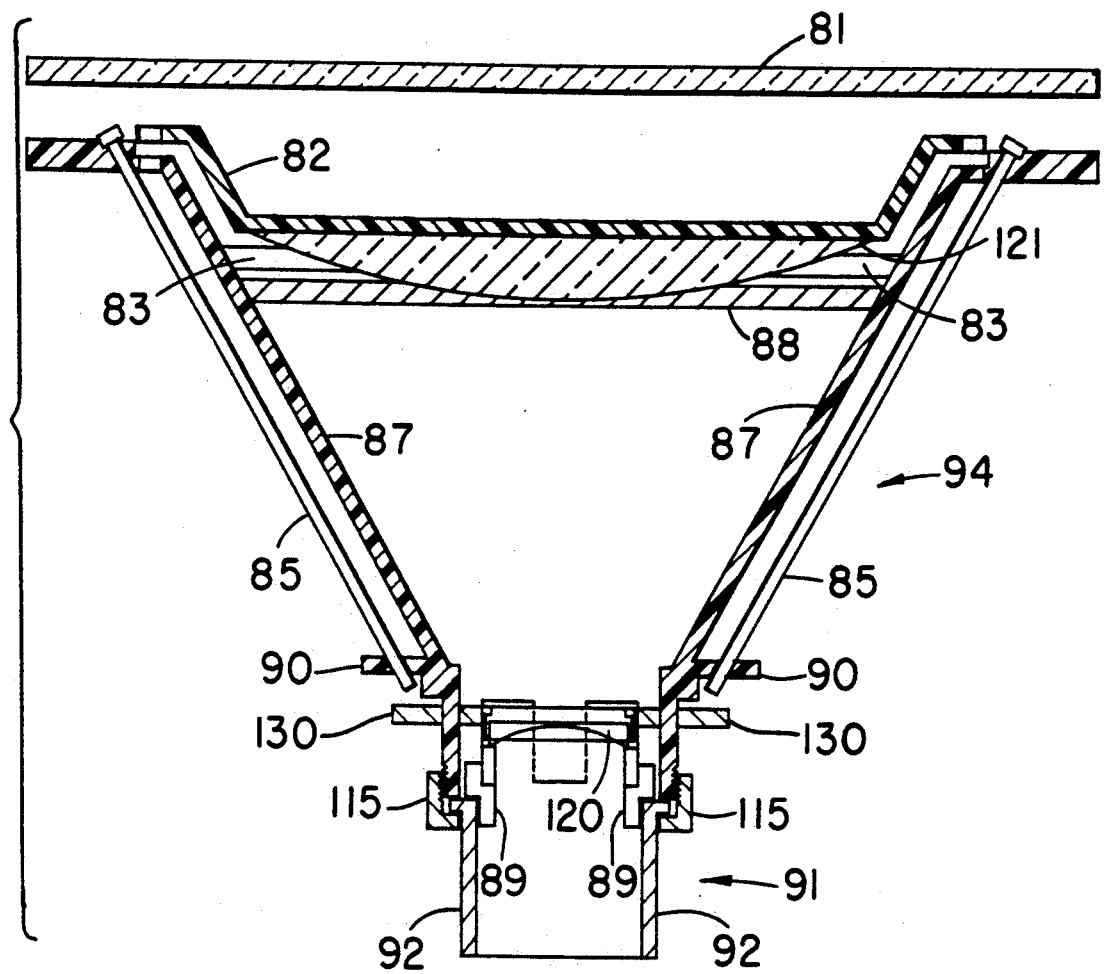
FIG. 12 is a top, sectional view of an embodiment of a driver's display device used with the VAPS.
Figure 13:
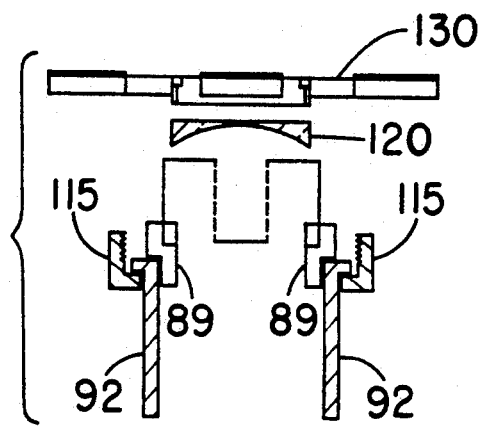
FIG. 13 is an exploded view of an embodiment of a diverging lens assembly for the driver's display unit of the VAPS.

Each VAPS requires a pair of visual display devices 70 to be mounted within easy visual access of the motor vehicle driver in order to simultaneously relay the views from the left and right receptors 41, 50 placed on the front and/or rear sides of the vehicle C. As each of the devices is functionally and structurally similar, only one is described herein. Each device is formed in the following manner. Referring to FIGS. 12, 13 and 14, a concave, plano-concave or asymmetric diverging lens 120 is oriented with the diverging lens's appropriate curvature toward the image source to induce divergence in the image received from the fiberoptic cable, thus expanding the image's size. A convex, plano-convex or asymmetric converging lens 121 is oriented with the converging lens's appropriate curvature toward the image source to correct the divergence of the image to present a relatively clear, undistorted, magnified image to the operator with the object being viewed in clear focus at a distance of approximately fifteen feet or more away from the receptor device 41, 50 of the VAPS. A one piece diverging lens casing assembly of a design functionally similar to that of the receptor diverging lens casing, with the exclusion of the optional speed linked electromechanical shutter device, uses the same type of adjusting bracket as the receptor diverging lens assembly. A display device casing assembly essentially identical to that used for the receptor device casing assembly, allowing for size variation, uses the same type of adjusting screw assembly and converging lens retaining assembly. A cover plate made of a transparent material such as glass or plastic is either made of or coated with a material that reduces reflected light from the outer surface, e.g., a nonglare surface, in order to increase overall usability in bright light conditions.

Figure 16:
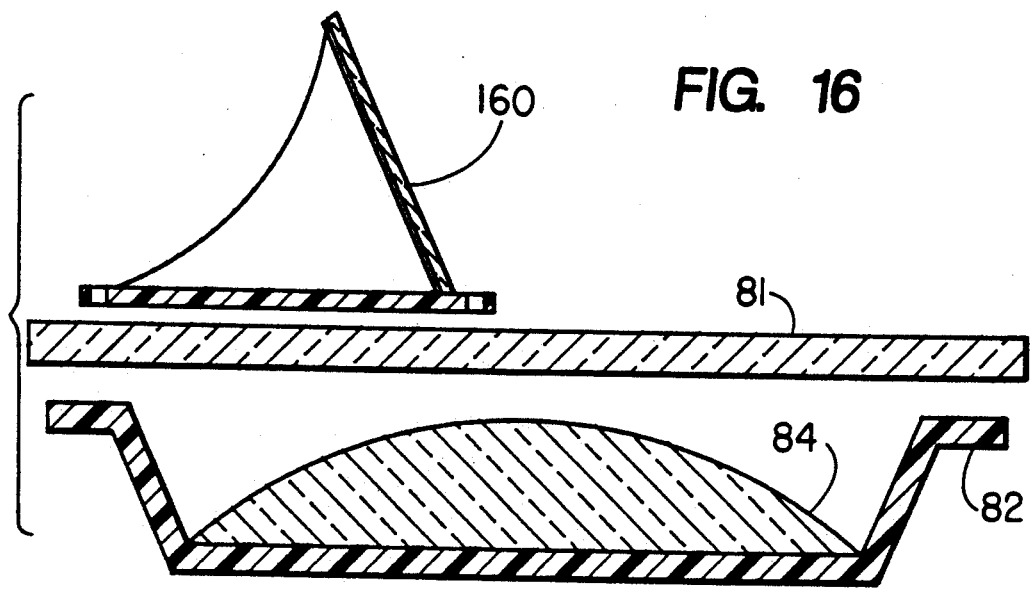
FIG. 16 is a side section view of an embodiment of the mounted mirror or prism "split view" assembly for the receptor device of the VAPS.
Figure 17:
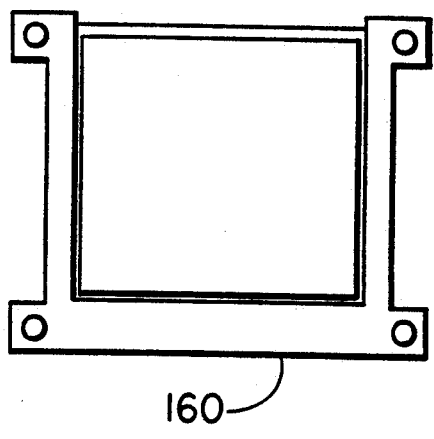
FIG. 17 is a bottom view of the mirror or prism assembly shown at the upper left of FIG. 16.
Figure 18:
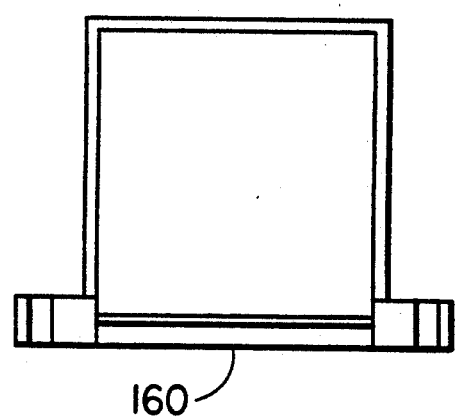
FIG. 18 is a front view of the mirror or prism assembly shown at the upper left of FIG. 16.

As the VAPS is designed for generalized use on a variety of different types of vehicles, it may be necessary to vary the VAPS's capabilities in order to better serve the needs of the user. Accordingly, two such possible modifications are detailed below. In some driving and parking situations, it is possible to have the view of the lane that the operator is attempting to enter blocked by vehicles or structures to the rear and the side of the operator's vehicle, such as when attempting to pull out into the road from a parallel parking space. In this situation, it would enhance the operator's ability to accomplish the maneuver safely if the VAPS allowed a view of the road to the rear and side of the operator's vehicle beyond what is available via the conventional side view mirror. Accordingly, the system has been designed to allow the addition of a mirror or prism 160 (see FIGS. 16, 17 and 18) device to the receptor assembly to redirect part of the VAPS's field of view to accomplish this goal. In effect, this will present the operator of the vehicle C with the appearance and function of a dual view display from each device so equipped without the necessity of additional receptors, display or fiberoptic cables to achieve this capability.

Some few individuals suffer from a sensitivity to motion sickness or to a condition known as flicker vertigo when they are exposed to rapid variations in light intensity. To prevent any substantial possibility of this occurring with the VAPS, the receptor device is designed to allow the incorporation of a speed activated electromechanical shutter to block image transmission from the receptor device to the fiberoptic cable system. Such activation means do not fall within the scope of this invention, per se. However, it is recommended that the speed linked electromechanical shutter be opened when power is applied to the ignition and to remain open until the vehicle C has reached such speed as will obviate utilization of the VAPS for its intended purpose with provision for reopening when the vehicle has reduced speed to such a point as to make it likely that the VAPS will again be of use.

It is to be understood that the present invention is not limited to the embodiments described above, but encompasses any and all embodiments within the scope of the following claims.

I claim:

1. A visual accident prevention system comprising:
    an outer casing being fitted to receive at least one fiberoptic transmission cable and at least one fiberoptic reception cable through at least one port;
    each of said at least one fiberoptic reception cable include at least one forward receptor and at least one rear receptor;
    each of said at least one forward receptor receive a forward input through a forward light gathering area;
    each of said at least one forward receptor transmit a forward output through a forward light transmitting area;
    each of said at least one rear receptor receive a rear input through a rear light gathering area;
    each of said at least one rear receptor transmit a rear output through a rear light transmitting area;
    at least one display device;
    each of said at least one port being configured for a straight tip type connector;
    each of said at least one port including a switch assembly mount;
    said switch assembly mount being designed to receive a mirrored surface switch assembly;
    said mirrored surface switch assembly being a mobile fixture;
    said mirrored surface switch assembly mounting a reflective surface at a desired angle for reflection of a transmitted signal to each of said at least one fiberoptic reception cable; and
    a switch activator.

2. The visual accident prevention system according to claim 1, each of said at least one rear receptor comprising:
    a structural piece composed of a high strength material;
    said structural piece incorporating means for mounting a second reflective surface allowing light images to be reflected through a plurality of plurality of support legs of each of said at least one rear receptor:
    said second reflective surface being attached to said structural piece by fastening means;
    said plurality of support legs of each of said at least one rear receptor incorporating support fastening means, whereby said plurality of support legs are constructed so as not to obstruct said forward light gathering area, said forward light transmitting area, said rear light gathering area or said rear light transmitting area; and
    a shroud support being structurally formed as part of said structural piece, whereby said shroud support is included to strengthen and stabilize said structural piece as well as reduce glare and protect said second reflective surface from dirt and debris.

3. The visual accident prevention system according to claim 2, each of said at least one rear receptor comprising:
    a rear cover plate being composed of a transparent material;
    said rear cover plate reducing a transmission of a plurality of harmful frequencies of light so as to protect both said visual accident prevention system and a user;
    a rear converging lens retainer being constructed of said high strength material;
    said rear converging lens retainer incorporating a padding material on a surface contacting a rear converging lens;
    said rear converging lens being placed with a greater curvature of said rear converging lens oriented toward a rear image source;
    said rear converging lens focusing a rear light image received through said rear cover plate;
    said rear converging lens producing a rear reduced size light image;
    a rear diverging lens being placed with a greater negative curvature of said rear diverging lens oriented toward said rear image source;
    said rear diverging lens receiving said rear reduced size light image from said rear converging lens;
    said rear diverging lens correcting a rear convergence of a plurality of rear light rays;
    said rear convergence of said plurality of rear light rays being imparted by said rear converging lens;
    said rear diverging lens producing a rear essentially coherent nonaberrant reduced image, whereby said rear diverging lens improves image transmission quality by reducing a diffraction, reflection or refraction caused when light rays enter an interface between materials of different densities at an angle;
    a rear conjunction of said rear converging lens and said rear diverging lens achieves a focus of at least fifteen feet with a field of view no less than ten feet wide at a minimum focusing distance, whereby a rear converging lens orientation and a rear diverging lens orientation of said rear diverging lens is intended to reduce a natural distortion and a natural aberration produced by any lens system;
    a rear lens casing being composed of said high strength material;

said rear lens casing being designed to surround and protect said rear cover plate, said rear converging lens retainer, said padding material, said rear converging lens and said rear diverging lens;

an interior of said rear lens casing incorporating a rear padded flange and a rear second flange;

said rear padded flange seating and supporting said rear converging lens;

said rear second flange seating a rear diverging lens assembly;

an exterior of said rear lens casing having a plurality of guide tabs and a rear section;

said plurality of guide tabs of said exterior of said rear lens casing aligning and supporting a plurality of rear diverging lens adjusting screws;

said rear section of said exterior of said rear lens casing being slotted to accept a rear diverging lens adjusting bracket;

said rear section of said exterior of said rear lens casing being threaded to accept a rear diverging lens assembly retaining cap, wherein a symmetrical design of said rear lens casing is intended to allow ease of manufacturing by a two piece process thus reducing cost;

a rear diverging lens assembly casing being constructed of a two piece design of said high strength material;

said rear diverging lens assembly including a rear lens piece and a rear connecting piece;

said rear lens piece of said rear diverging lens assembly incorporating a padded interior flange to seat said rear diverging lens and a plurality of slots;

said padded interior flange of said rear lens piece of said rear diverging lens assembly providing stability and consistency of adjustment to said rear diverging lens;

said plurality of slots of said rear lens piece of said rear diverging lens assembly accepting said guide tabs of said exterior of said rear lens casing at a front of said rear lens piece of said rear diverging lens assembly;

said rear connecting piece of said rear diverging lens assembly including an interior flange and an exterior retaining flange;

said interior flange of said rear connecting piece of said rear diverging lens assembly supporting a rear speed linked electromechanical shutter;

said rear speed linked electromechanical shutter being designed to open only at a low speed, whereby said rear speed linked electromechanical shutter reduces or eliminates any discomfort to a user susceptible to vertigo or motion sickness;

said exterior retaining flange of said rear connecting piece of said rear diverging lens assembly being designed to seat said rear diverging lens assembly retaining cap and to accept a straight tip type fiberoptic connector at a rear portion of said rear connecting piece of said rear diverging lens assembly;

a rear coherent fiberoptic cable being designed to receive and transmit said rear reduced image to said plurality of display devices; and said rear coherent fiberoptic cable being connected to said rear diverging lens assembly by said straight tip type connector.

4. The visual accident prevention system according to claim 1, each of said at least one forward receptor comprising:

a cover plate being composed of a transparent material;

said cover plate reducing a transmission of a plurality of harmful frequencies of light so as to protect both said visual accident prevention system and a user;

a converging lens retainer being constructed of a high strength material;

said converging lens retainer incorporating a padding material on a surface contacting a converging lens;

said converging lens being placed with a greater curvature of said converging lens oriented toward an image source;

said converging lens focusing a light image received through said cover plate;

said converging lens producing a reduced size light image;

a diverging lens being placed with a greater negative curvature of said diverging lens oriented toward said image source;

said diverging lens receiving said reduced size light image from said converging lens;

said diverging lens correcting a convergence of a plurality of light rays;

said convergence of said plurality of light rays being imparted by said converting lens;

said diverging lens producing an essentially coherent nonaberrant reduced image, whereby said diverging lens improves image transmission quality by reducing the diffraction, reflection or refraction caused when light rays enter an interface between material of different densities at an angle;

a conjunction of said converging lens and said diverging lens achieves a focus of at least fifteen feet with a field of view no less than ten feet wide at a minimum focusing distance, whereby a converging lens orientation and a diverging lens orientation is intended to reduce a natural distortion and a natural aberration produced by any lens system;

a main lens casing being composed of a high strength material;

said main lens casing being designed to surround and protect said cover plate, said converging lens retainer, said padding material, said converging lens and said diverging lens;

an interior of said main lens casing incorporating a padded flange and a second flange;

said padded flange seating and supporting said converging lens;

said second flange seating a diverging lens assembly;

an exterior of said main lens casing having a plurality of guide tabs and a rear section;

said plurality of guide tabs aligning and supporting a plurality of diverging lens adjusting screws;

said rear section being slotted to accept a diverging lens adjusting bracket;

said rear section being threaded to accept a diverging lens assembly retaining cap, whereby a symmetrical design of said lens casing is intended to allow ease of manufacturing by a two piece process thus reducing cost;

a diverging lens assembly casing being constructed of a two piece design of said high strength material;

said diverging lens assembly casing including a lens piece and a connecting piece;

said lens piece incorporating a padded interior flange to seat said diverging lens;

said lens piece incorporating a plurality of slots;

said padded interior flange providing stability and consistency of adjustment to said diverging lens;

said plurality of slots accepting said plurality of guide tabs at a front of said lens piece;

said connecting piece including an interior flange and an exterior retaining flange;

said interior flange of said second piece supporting a speed linked electromechanical shutter;

said speed linked electromechanical shutter being designed to open only at a low speed, whereby said speed linked electromechanical shutter reduces or eliminates any discomfort to the user susceptible to vertigo or motion sickness;

said exterior retaining flange of said connecting piece being designed to seat said diverging lens assembly retaining cap and to accept a straight tip type fiber-optic connector at a rear portion of said connecting piece;

a coherent fiberoptic cable being designed to receive and transmit said reduced image to said plurality of display devices; and said coherent fiberoptic cable being connected to said diverging lens assembly by said straight tip type connector.

5. The visual accident prevention system according to claim 1, said mirrored surface switch assembly further comprising:

said reflective surface is flat;

said switch assembly mount being a rotary switch assembly;

said rotary switch assembly consisting of a main body piece;

said main body piece having a threaded retaining coupler; and said threaded retaining coupler having a plurality of mating threads on said outer casing and a connector for said switch activator.

6. The visual accident prevention system according to claim 1, said mirrored surface switch assembly further comprising:

said reflective surface is flat;

said switch assembly mount being a hinged switch assembly;

said hinged switch assembly incorporating an angle adjustment device;

said angle adjustment device consisting of a threaded screw passed through said outer casing to precisely adjust an angle of reflection; and said hinged switch assembly being shaped to allow said hinged switch assembly to completely clear a light path when in a nonreflecting straight mode.

7. The visual accident prevention system according to claim 1, said mirrored surface switch assembly further comprising:

said reflecting surface is curved;

said switch assembly mount being a rotary switch assembly;

said rotary switch assembly consisting of a main body piece;

said main body piece having a threaded retaining coupler; and said threaded retaining coupler having a plurality mating threads on said outer casing and a connector for said switch activator.

8. The visual accident prevention system according to claim 1, said mirrored surface switch assembly further comprising:

said reflective surface is curved;

said switch assembly mount being a hinged switch assembly;

said hinged switch assembly incorporating an angle adjustment device;

said angle adjustment device consisting of a threaded screw passed through said outer casing to precisely adjust an angle of reflection; and said hinged switch assembly being shaped to allow said hinged switch assembly to completely clear a light path when in a nonreflecting straight mode.

9. The visual accident prevention system according to claim 1, said switch activator further consists of a sensor;

said sensor being set to detect a direction of rotation of, selectively, one of the group of a wheel, an axle or a drive train piece; and said sensor being used in conjunction with an electric solenoid, whereby said sensor being used in conjunction with said electric solenoid automatically selects said forward outputs from each of said at least one forward receptor to be transmitted to each of said at least one display device when the vehicle is in a forward gear and selects said rear outputs from each of said at least one rear receptor when the vehicle is in a reverse gear.

10. The visual accident prevention system according to claim 1, said switch activator consisting of a cable assembly linked to a gear selector of a vehicle, whereby said cable assembly linked to said gear selector of the vehicle automatically selects said input from each of said at least one forward receptor to be transmitted to each of said at least one display device when the vehicle is in a forward gear and selects said input from each of said at least one rear receptor when the vehicle is in a reverse gear.

11. The visual accident prevention system according to claim 1, further comprising:

each of said at least one forward receptor including a front angled mirror, whereby said front angled mirror redirects a portion of a field of view of said visual accident prevention system according to claim 1 allowing a user a view of a road to a rear and a side of a vehicle beyond what is available with said visual accident prevention system according to claim 1;

at least one additional forward lens display device;

each of said at least one additional forward lens display device receiving an image from said front angled mirror of each of said at least one forward receptor;

each of said at least one rear receptor including a rear angled mirror, whereby said rear angled mirror redirects a portion of a field of view of said visual accident prevention system according to claim 1 allowing the user a view of the road to the rear and side of the vehicle beyond what is available with said visual accident prevention system according to claim 1;

at least one additional rear lens display device; and each of said at least one additional rear lens display device receiving an image from said rear angled mirror of each of said plurality of rear receptor.

12. The visual accident prevention system according to claim 1, further comprising:

each of said at least one forward receptor include an front prism, whereby said front prism redirects a portion of a field of view of said visual accident prevention system according to claim 1 allowing a user a view of the road to a rear and a side of a vehicle beyond what is available with said visual accident prevention system according to claim 1;
at least one additional forward lens display devices;
each of said at least one additional forward lens display devices receiving an image from said front prism of each of said at least one forward receptor;
each of said at least one rear receptor include a rear prism, whereby said rear prism redirects a portion of the field of view of said visual accident prevention system according to claim 1 allowing the user a view of the road to the rear and the side of the vehicle beyond what is available with said visual accident prevention system according to claim 1;
at least one additional rear lens display device; and
each of said at least one additional rear lens display device receiving an image from said rear prism of each of said at least one rear receptor.

* * * * *